United States Statutory Invention Registration [19]

[11] Reg. Number: H215

Stewart [43] Published: Feb. 3, 1987

[54] FUZE FOR RIOT CONTROL GRENADE

[75] Inventor: Paul L. Stewart, Joppa, Md.

[73] Assignee: The United States of America as represented by the Secretary of the Army, Washington, D.C.

[21] Appl. No.: 729,839

[22] Filed: May 2, 1985

[51] Int. Cl.[4] ..... F42B 27/00
[52] U.S. Cl. ..... 102/487
[58] Field of Search ..... 102/482–488, 102/499, 259, 260

[56] References Cited

U.S. PATENT DOCUMENTS

| | | | |
|---|---|---|---|
| 2,148,623 | 2/1939 | Hunter | 102/368 |
| 3,048,111 | 8/1962 | Baker et al. | 102/259 X |
| 3,616,753 | 11/1971 | Carlson | 102/487 |
| 3,731,631 | 5/1973 | Berlin et al. | 102/487 |

FOREIGN PATENT DOCUMENTS

| | | | |
|---|---|---|---|
| 2053948 | 4/1971 | France | 102/482 |

*Primary Examiner*—Harold J. Tudor
*Attorney, Agent, or Firm*—Anthony T. Lane; Robert P. Gibson; Edward F. Costigan

[57] ABSTRACT

This fuze is a subassembly of a spherical smoke grenade. The grenade comprises a rubber case with the main charge therein. The fuze comprises a metal body one surface of which is sperhical and forms part of the spherical exterior of the grenade. The fuze comprises an arm/safe mechanism which includes pins, pull rings, a handle and a hermetically sealed delay ignition system which comprises a primer, two ignition mixes and a delay mix. The firing pin is mounted in a radial hole in the fuze body with an arm/safe pin mounted in another hole which is 90° away from the firing pin hole. The arm/safe pin engages a slot in the firing pin to hold it in the safe or retracted position. The arm/safe mechanism is designed so that none of the parts thereof, except for the handle, can fly out as the grenade is thrown. The O-rings associated with the firing pin and the arm/safe pin are designed so that they provide a moisture proof seal during the shelf life of the grenade but when the grenade is thrown they do not produce any unwanted friction which might cause misfiring.

4 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FUZE FOR RIOT CONTROL GRENADE

The invention described herein may be manufactured, used and licensed by or for the Government for governmental purposes without the payment to me of any royalties thereon.

BACKGROUND OF THE INVENTION

The US Army's M47/M48 riot control grenades have been suspended from issue because of certain hazards in the operation thereof caused by faulty design. These granades, when activated, emit a cloud of smoke which includes eye and nasal passage irritants. The grenades are intended to disburse unruly and unlawfully assembled crowds, but are not intended to produce any injury, however slight, except for brief eye and nose irritation. The prior art design of these grenades included a two piece firing pin and one piece of this pin was released at high speed, propelled by the firing pin spring, when the firing pin was actuated as the grenade was thrown at a target. These firing pin sections sometimes caused facial or eye injury to the grenade user. Also, these grenades were subject to occasional delayed firing, a condition known as "hang-fires". If this delayed firing occurred while the grenade was in the midst of the crowd to be dispersed, members of the crowd could be injured by the flying firing pin section. The hang-fire defect was caused by dry O-rings which would prevent the firing pins from freely moving after the grenade was armed.

The prior art arm/safe mechanism of this grenade also included a safety slide assembly which required selective assembly and hence was costly. Also, the grenades had occasional problems of pyrotechnic delay in its ignition system, because of the lack of hermetic sealing thereof.

The new fuze of the present invention overcomes all of these disadvantages of the old design.

SUMMARY OF THE INVENTION

The fuze is a subassembly of the generally spherical grenade, the sub-assembly comprises a metal fuze body, one surface of which is spherical and forms part of the spherical exterior of the grenade. The rubber case of the grenade is attached to the side of the fuze body which is opposite from its spherical surface. The arm/safe mechanism of the fuze comprises pins, pull rings, a handle, and the hermetically sealed delay ignition system comprises a primer, an expansion chamber, two ignition mixes, and a delay mix. The one-piece firing pin is mounted in the fuze body in a radial hole therein, with an arm/safe pin mounted in another hole in the fuze body which is 90° from the firing pin hole, with the arm/safe pin engaging a slot in the firing pin to hold it in the retracted or safe position. The arm/safe pin is held in place in the firing pin by a handle which normally blocks the arm/safe hole and is normally held in place by a pin connected to a pull ring. The arm/safe mechanism is designed so that none of the parts thereof can fly out as the grenade is thrown, or at any other time. Also, two safety pull rings must be pulled before the grenade is armed and ready to be thrown. The throwing of the grenade releases the aforementioned arm/safe pin which is then retracted from the firing pin groove or slot by its spring which also serves to jettison the grenade handle. The O-rings associated with the firing the arm/safe pins are designed so that they are compressed into oval cross-sections to provide air and moisture-tight sealing of the mechanism during the shelf life of the grenade, but upon the arming and firing of the device, the release of pressure on the rings causes them to revert to their circular cross sections and to thus preclude frictional contact with the holes in the fuze body, which friction had been the cause of the aforementioned hang-fire defect.

It is thus an object of the present invention to provide an improved fuze for a riot control grenade which comprises an arm/safe mechanism and a hermetically sealed ignition system both mounted on a metallic fuze body, said mechanism comprising a spring-loaded firing pin mounted in a hole in said fuze body and held in a safe or retracted position by a spring-loaded arm/safe pin mounted 90° therefrom. The arm/safe pin engages a groove in the firing pin and it is held in said groove by the pressure of a pin-locked handle which covers the outer end of the hole in which said arm/safe pin is mounted, and wherein said firing pin and arm/safe pins are provided with O-rings to provide moisture tight seal and are mounted to obviate friction which would interfere with the operation of said pins.

Another object of the invention is to provide a riot control grenade with a safe and reliable fuze system which includes two safety pull rings, a handle which is automatically jettisoned on the throwing of the grenade, and which includes an arm/safe mechanism which comprises a firing pin and one or more safety locking pins which cannot escape from the mechanism during its use or at any other time, and which fuze comprises O-rings mounted in such a way that they cannot interfere with the operation of moving parts to cause delayed firing of the fuze or misfiring thereof.

Another object of the invention is to provide a fuze for a riot control grenade which comprises a firing pin and an arm/safe pin which locks the firing pin in its retracted position and maintains the firing pin spring in a compressed state. Upon the arming of the grenade, the arm/safe pin is retracted by its spring to unlock the firing pin to permit it to function through the expansion of its spring, and wherein the retraction of said arm/safe pins causes the jettisoning of the grenade handle which normally prevents the arm/safe pin from retracting and wherein all of the parts of said fuze mechanism except said handle are positively retained within said grenade during the throwing and the firing thereof.

These and other objects and advantages of the invention will become apparent from the following detailed description and the drawings.

DETAILED DESCRIPTION OF A PREFERRED EMBODIMENT

The grenade in which the novel fuze is used is sometimes called a baseball grenade since it is the same size and shape as a baseball and is thrown like one. Most of the spherical surface of the grenade comprises the rubber grenade case which contains the smoke-generating chemical or main charge. The fuze comprises a metal body to which the rubber case is attached, by a threaded adaptor with the mechanical fuze mechanism mounted in bores or holes therein and the delay ignition system comprises a cartridge tube containing the primer and the various ignition mixtures centrally attached to the interior surface of the fuze body. A curved grenade handle is pivoted around a pin in the fuze body and before the throwing of the grenade, the handle lies up against the outside of the grenade case. To arm the grenade, two positive safing pins are pulled. After these two safing pins are pulled, the user, in grasping the grenade, will hold the handle down which prevents operation of the firing pin until the grenade is thrown and the handle released. This permits the firing pin to strike the primer which will ignite the main charge after a delay of a few seconds. An emission hole comprising an arcuate slot in the rubber case permits the smoke generated by the main charge to escape. When the grenade leaves the user's hand, the handle is automatically jettisoned by means of a spring, but all other parts are positively retained.

Figure 1:
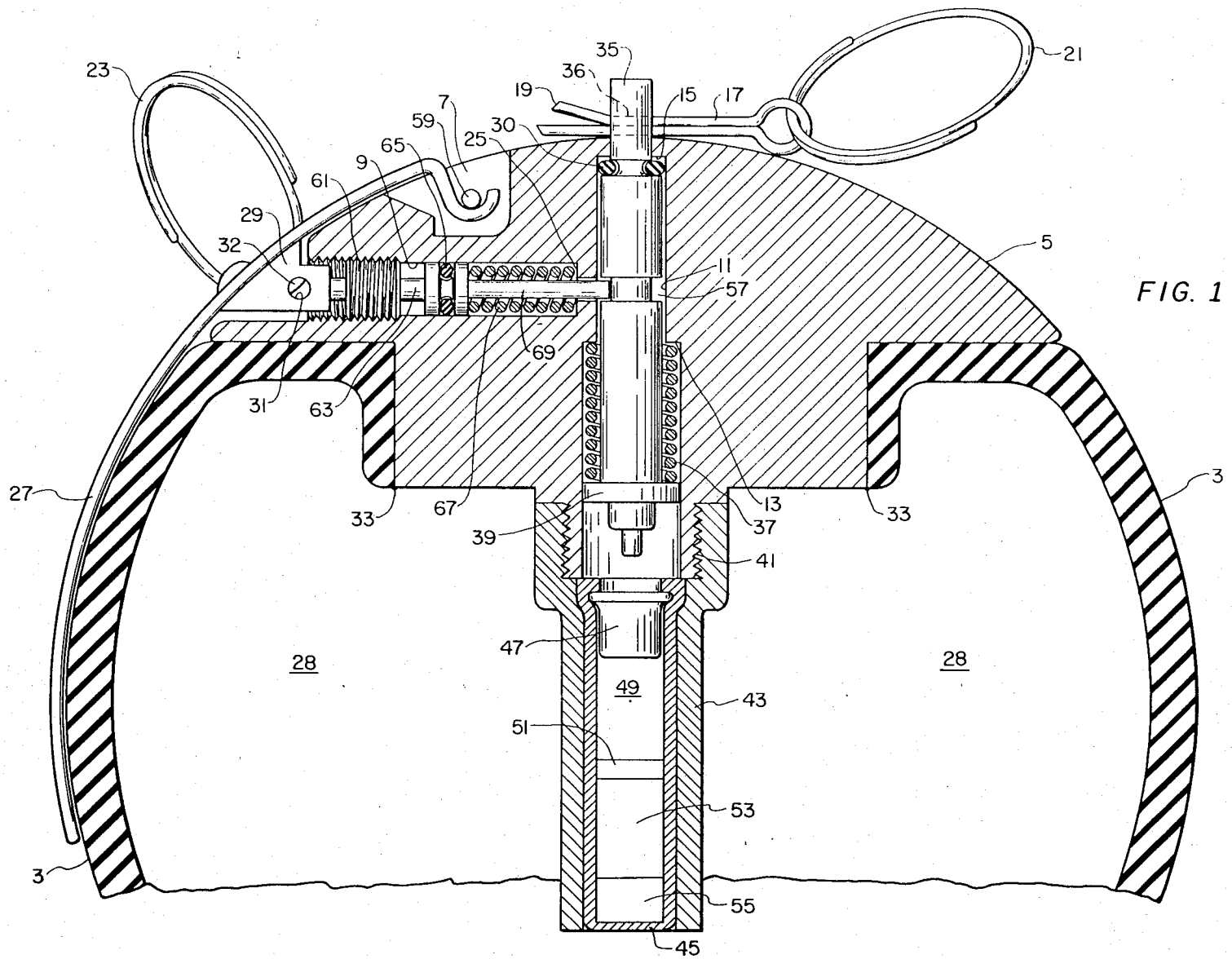
FIG. 1 is a cross sectional view of the grenade showing the fuze mechanism.

FIG. 1 is a cross sectional view of a grenade which embodies the fuze of the present invention, the cross section passing through the center of the generally spherical grenade. The metallic fuze body 5 has the rubber grenade case 3 attached thereto. The case 3 is attached to the lower or non-spherical portion of the fuze body by means of a suitable bonding material or a threaded adaptor bonded into the rubber grenade body in the region 33. The fuze body includes a hole or bore 11 which is a radius of the sphere comprising the grenade. The hole 11 has two steps in the diameter thereof, 15 and 13, and the firing pin 35 has three different diameters, being the smallest at the top, above step 15 in hole 11, and having a flange 39 near its lower end, below firing pin spring 37. The spring 37 is compressed between flange 39 and shoulder or step 13 so that the firing pin is urged inward or toward the primer 47 by its spring. In addition, the firing pin 35 includes an annular slot or groove 57 which is engaged by the shank 69 of the arm/safe pin to hold the firing pin in its retracted position. The positive safing pin 17, which passes through a hole 36 near the top or anterior end of the firing pin also holds the firing pin in its safe or retracted position. The pin 17 is shown as a Cotter pin and has one tail thereof, 19, bent back approximately 45° to prevent the pin from falling out. The pull ring 21 is provided for removing the pin 17.

Case adapter 43 comprising a hollow cylinder is centrally attached to the interior or lower side of the fuze body 5 so that the bore of the case adapter lines up with the bore of the firing pin hole 11. The adapter 43 has internal threads at its upper end which screw onto a threaded shank 41 which forms the lower portion of hole 11. The case adapter 43 has mounted therein the cartridge tube 45 which contains the pyrotechnic components of the fuze. These components are hermetically sealed within the cartridge tube 45, to prevent deterioration of the various ignition mixtures therein. The topmost component in the tube 45 is the primer 47 which is struck and ignited by the lower end of the firing pin which is impelled downward by its spring 37 as the grenade fires. The volume 49 below the primer is an empty expansion chamber; 51 is an ignition mix, 53 a delay mix, and 55 the output which ignites the main charge 28 which fills the remainder of the interior of the grenade. The lower end of the cartridge tube is provided with a thin wall which facilitates rupture by the output mix 55.

Figure 2:
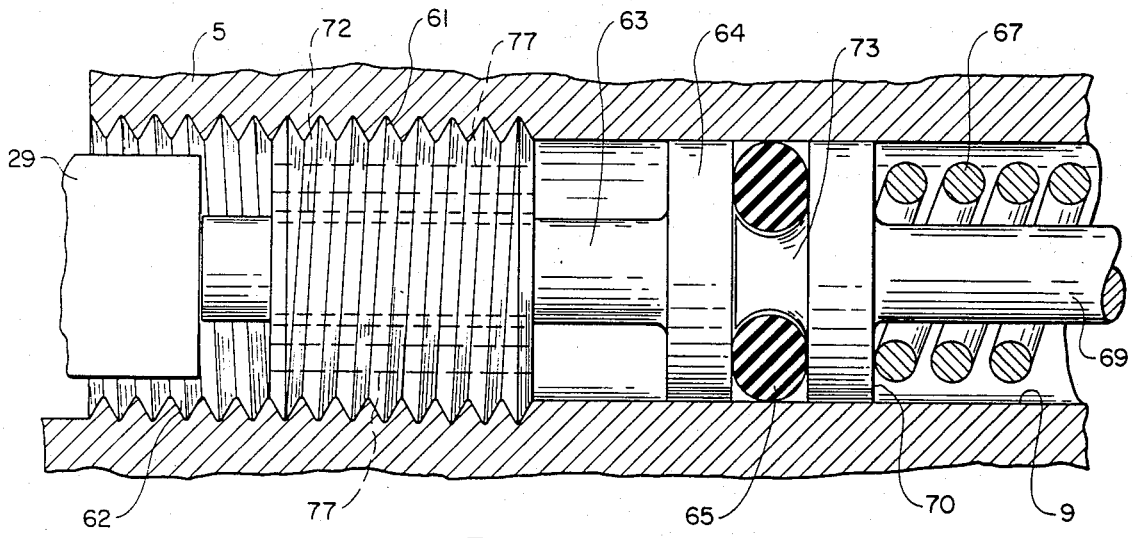
FIG. 2 is an enlarged view of one portion of the arm/safe mechanism of the fuze.

The arm/safe mechanism further comprises a hole or bore 9 in the fuze body 5, the hole 9 being perpendicular to the firing pin hole 11 and communicating therewith. The arm/safe pin comprises a shank 69, a flange 70 and a stud 73 on which is mounted O-ring 65, as best shown in FIG. 2. The arm/safe pin is mounted in hole 9, as shown, with its shank end projecting into groove 57 in the firing pin, with the arm/safe spring 67 urging the arm/safe pin out of hole 9 or to the left in FIGS. 1 and 2. The arm/safe pin is held in the position illustrated by means of the arm/safe lock pin which comprises shank 63 and flange 64, which butts up against stud 73. The shank 63 passes through a central hole 72 in lock pin guide 61. The guide 61 has external threads thereon which mate with the internally threaded portion of bore 9 as indicated by reference numeral 62 in FIG. 2. The lock pin guide is provided with one or more pressure relief holes 77 which extend parallel to the axis of the hole 9.

The grenade handle 27 pivots around roll pin 59 which is mounted in a recess 7 in the fuze body 5. A metal block 29 is attached to handle 27 and the right end of block 29 butts up against the left end of the shank 63 of the arm/safe lock pin. A hole 31 in block 29 has a second positive safing pin 32 therein. There is a mating hole (not shown) in the fuze body behind block 29 through which pin 32 also passes. Thus the pin 32 locks the arm/safe lock pin, the arm/safe pin and the handle in the safety position as illustrated in FIGS. 1 and 2. The pull ring 23 is attached to the opposite end of pin 32. After lock pin guide 61 is screwed into place it is staked in place so that it cannot work loose.

The arm/safe spring 67 butts against shoulder 25 in hole 9 so that this spring urges the arm/safe pin out of locking engagement with the firing pin 35. As can be seen in FIG. 2, the O-ring 65 is flattened into an oval or elliptical cross sectional shape due to the fact that the height or length of stud 73 on which it is mounted is less than the cross sectional diameter of the unstressed O-ring. This flattening of the O-ring provides a snug fit with the wall of hole 9 to provide an air and moisture tight seal for the interior of the grenade, however when the two flanges 64 and 70 separate upon the firing of the grenade, this pressure on the O-ring is released and it tends to revert to its circular cross section, which means that its outside diameter will be les than the inside diameter of hole 9 and no friction can then interfere with the movement of the arm/safe and arm/safe lock pins.

Figure 3:
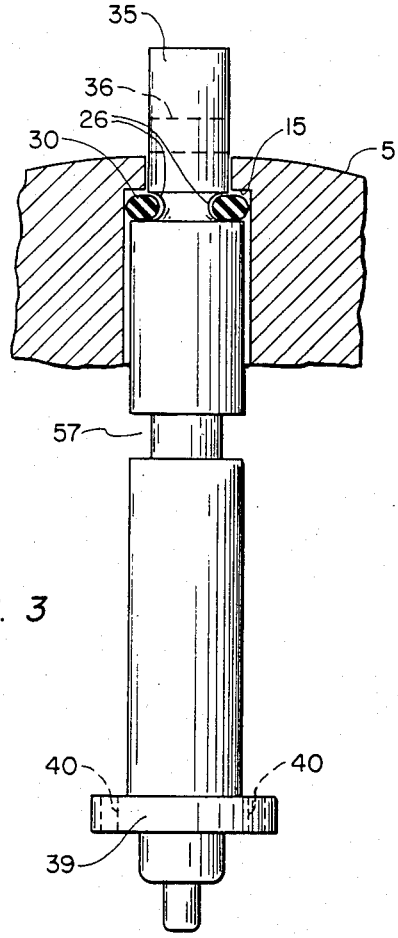
FIG. 3 is an enlarged view of the grenade's firing pin and the O-ring thereof.

Also, as shown in FIG. 3, the firing pin O-ring 30 is similarly compressed into an oval cross section when the firing pin is retracted. As shown, the shoulder 15 in fuze body 5 and the mating shoulder 26 on the firing pin define a space which is slightly less than the unstressed cross sectional diameter of the ring 30, and thus the O-ring is flattened between the two shoulders to provide a tight seal at this point. Also, when the firing pin is operated, the O-ring will retract from the wall of bore 11 to provide friction-free movement of the firing pin, just as does O-ring 65.

The flange 39 near the lower end of the firing pin may be provided with one or more pressure relief holes such as 40, which permit the firing pin to freely move toward the primer 47 under the influence of firing pin spring 37 during the firing of the grenade.

To arm the grenade, the user would grasp the grenade with his throwing hand so that the handle is held against the grenade case. Then, with his other hand he would in sequence remove both of the positive safing pins by means of their pull rings, preferrably removing the pin 17 in the firing pin first. The grenade is then ready to throw and as soon as it leaves the thrower's hand, the lack of manual pressure on the handle 27 permits arm/safe spring 67 to push the arm/safe pin and the arm/safe lock pin to the left as seen in the drawings. The shank 63 of the arm/safe lock pin rapidly pushes the metal block 29 and the handle to the left. The velocity imparted to the handle is great enough to cause the hooked portion thereof which is wrapped around pin 59 to become unhooked so that the handle and block are thrown free of the grenade, which continues its flight unencumbered by any external appendages which might reduce its range or cause it to follow a curved path.

When the flange 64 of the arm/safe lock pin reaches the lock pin guide, it stops and cannot escape to cause any damage or injury. The pressure relief holes 77 in guide 61 permit the air between the guide and the flange 64 to escape.

The retraction of the arm/safe pin from the groove 57 in the firing pin permits this pin to be moved toward the primer 47 under the influence of firing pin spring 37. In accordance with another feature of the invention, the cartridge tube 45 is hermetically sealed to prevent damage to the contents thereof by moisture.

While the invention has been described in connection with an illustrative embodiment, obvious variations therein will be apparent to those skilled in this art, accordingly the invention should be limited only by the scope of the appended claims.

What is claimed is:

1. An improved fuze for a smoke-grenade comprising: a metal fuze body having a partial spherical surface provided with a radial hole, a one-piece firing pin retainably mounted in said radial hole, said radial hole having three steps in diameter with the largest diameter housing a spring, said radial hole forming two shoulders, said firing pin having an anterior end, and interior end, and three different diameters resulting in two shoulders wherein the smallest diameter is at the anterior end, and the largest diameter having a flange adjacent said interior end, said spring mounted over said firing pin and said flange retaining said spring in said housing in an energy storing condition, said three steps of said radial hole mating with said diameters of said firing pin, said firing pin having an annular groove, said firing pin also having a second hole adjacent said anterior end, a positive safing pin mounted in said second hole holding said firing pin in a retracted position, said fuze body having an arm/safe hole at 90° to said radial hole, a slideable arm/safe pin having a shank and twin spaced-apart flanges mounted in said arm/safe hole, said shank projecting into said groove of said firing pin retaining said firing pin in the retracted position, said twin flanges of said arm/safe pin consisting of a first and second flange, said first flange retaining a second spring in the energized position maintaining engagement of said arm/safe pin with said firing pin, and said first and second flange maintaining an O-ring in a compressed position therebetween as a seal against moisture, a threaded retainer maintaining said arm/safe pin, said spring, and said O-ring in said arm/safe hole at all times, a curved handle pivoted on a pin on said fuze body, said handle normally blocking said arm/safe hole and holding said slideable arm/safe pin in said groove of said firing pin, a second positive safing pin retaining said handle in place, said arm/safe pin engaged in said firing pin in a retracted position.

2. The fuzes of claim 1 wherein a hermetically sealed cartridge tube is operatively mounted on said fuze body in communicating relationship with said firing-pin.

3. The fuze of claim 2 wherein said handle is jettisoned by said shank of said slideable arm/safe pin when said second positive safing pin is removed with said arm/safe pin being positively retained in said fuze body.

4. The fuze of claim 3 wherein a second O-ring is mounted around said firing pin adjacent said anterior end of said firing pin so that said O-ring is compressed between said shoulders of said hole and said firing pin.

* * * * *